US012571961B2

(12) United States Patent    (10) Patent No.: US 12,571,961 B2
Shah et al.    (45) Date of Patent: Mar. 10, 2026

(54) ECHELLE GRATINGS WITH A SHARED FREE PROPAGATION REGION

(71) Applicant: ROCKLEY PHOTONICS LIMITED, Altrincham (GB)

(72) Inventors: Shreyas Y. Shah, Pasadena, CA (US); Jeffrey Driscoll, San Jose, CA (US); Jin-Hyoung Lee, Yorba Linda, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 344 days.

(21) Appl. No.: 18/331,094

(22) Filed: Jun. 7, 2023

(65) Prior Publication Data

US 2023/0400629 A1    Dec. 14, 2023

Related U.S. Application Data

(60) Provisional application No. 63/366,050, filed on Jun. 8, 2022.

(51) Int. Cl.
   G02B 6/12    (2006.01)
(52) U.S. Cl.
   CPC ................................ G02B 6/12007 (2013.01)
(58) Field of Classification Search
   None
   See application file for complete search history.

(56) References Cited

U.S. PATENT DOCUMENTS

| | | | | |
|---|---|---|---|---|
| 5,371,813 A | * | 12/1994 | Artigue ................ | G02B 6/4246 |
| | | | | 359/570 |
| 5,889,906 A | * | 3/1999 | Chen .................. | G02B 6/12016 |
| | | | | 385/27 |
| 9,285,270 B2 | * | 3/2016 | Shibayama ........... | G01J 3/0291 |
| 10,444,073 B1 | * | 10/2019 | Noguchi .................. | G01J 3/06 |
| 11,460,642 B2 | * | 10/2022 | Hu ............................ | G02B 6/34 |
| 2004/0145738 A1 | * | 7/2004 | Sun ........................... | G01J 3/06 |
| | | | | 356/328 |
| 2007/0086703 A1 | * | 4/2007 | Kirk ................... | G02B 6/12007 |
| | | | | 385/24 |
| 2007/0291266 A1 | * | 12/2007 | Handa ...................... | G01J 3/20 |
| | | | | 356/328 |
| 2014/0086531 A1 | * | 3/2014 | Park .................. | G02B 6/12007 |
| | | | | 385/37 |

(Continued)

*Primary Examiner* — Jerry Rahll

(74) *Attorney, Agent, or Firm* — Womble Bond Dickinson (US) LLP

(57) ABSTRACT

Echelle gratings with a shared free propagation region. In some embodiments, a system includes: a first echelle grating; and a second echelle grating. The first echelle grating may include: a first input waveguide having an end on a first Rowland circle; a first grating on the first Rowland circle; and a first output waveguide having an end on the first Rowland circle. The second echelle grating may include: a second input waveguide having an end on a second Rowland circle; a second grating on the second Rowland circle; and a second output waveguide having an end on the second Rowland circle. The second input waveguide may be separate from the first input waveguide, the second output waveguide may be separate from the first output waveguide, and the first Rowland circle may overlap the second Rowland circle.

19 Claims, 17 Drawing Sheets

(56)         References Cited

U.S. PATENT DOCUMENTS

| | | | |
|---|---|---|---|
| 2015/0378099 A1* | 12/2015 | Rong | G02B 6/12004 |
| | | | 385/14 |
| 2017/0102270 A1* | 4/2017 | Ho | G01J 3/1895 |
| 2019/0041578 A1* | 2/2019 | Mahgerefteh | G02B 6/12016 |
| 2019/0056551 A1* | 2/2019 | Trita | G02B 6/29308 |

* cited by examiner

MWL1 grating
Length = 1640um

115b

120um

110a

LWL1 Output wg.

ECHELLE GRATINGS WITH A SHARED FREE PROPAGATION REGION

CROSS-REFERENCE TO RELATED APPLICATION(S)

The present application claims priority to and the benefit of U.S. Provisional Application No. 63/366,050, filed Jun. 8, 2022, entitled "ECHELLE GRATINGS WITH A SHARED FREE PROPAGATION REGION", the entire content of which is incorporated herein by reference.

FIELD

One or more aspects of embodiments according to the present disclosure relate to photonic integrated circuits, and more particularly to echelle gratings.

BACKGROUND

Echelle gratings may be used in a photonic integrated circuit, for example, as optical filters, as multiplexers, or as demultiplexers. An echelle grating may occupy a significant amount of area on a photonic integrated circuit chip.

It is with respect to this general technical environment that aspects of the present disclosure are related.

SUMMARY

According to an embodiment of the present disclosure, there is provided a system, including: a first echelle grating; and a second echelle grating, the first echelle grating including: a first input waveguide having an end on a first Rowland circle; a first grating on the first Rowland circle; and a first output waveguide having an end on the first Rowland circle, the second echelle grating including: a second input waveguide having an end on a second Rowland circle; a second grating on the second Rowland circle; and a second output waveguide having an end on the second Rowland circle, the second input waveguide being separate from the first input waveguide, the second output waveguide being separate from the first output waveguide, and the first Rowland circle overlapping the second Rowland circle.

In some embodiments, an optical path between the first input waveguide and the first grating intersects an optical path between the second input waveguide and the second grating.

In some embodiments, the second grating is the same grating as the first grating.

In some embodiments, the second grating is separate from the first grating.

In some embodiments, at least 30% of the first Rowland circle overlaps the second Rowland circle.

In some embodiments, less than 80% of the first Rowland circle overlaps the second Rowland circle.

In some embodiments, the diameter of the second Rowland circle is within 30% of the diameter of the first Rowland circle.

In some embodiments, the system further includes a third echelle grating, the third echelle grating including: a third input waveguide having an end on a third Rowland circle; a third grating on the third Rowland circle; and a third output waveguide having an end on the third Rowland circle, the first Rowland circle overlapping the third Rowland circle.

In some embodiments, the system further includes a fourth echelle grating, the fourth echelle grating including: a fourth input waveguide having an end on a fourth Rowland circle; a fourth grating on the fourth Rowland circle; and a fourth output waveguide having an end on the fourth Rowland circle, the first Rowland circle overlapping the fourth Rowland circle.

In some embodiments, the echelle gratings occupy an area of less than 8 square millimeters.

In some embodiments, the echelle gratings occupy an area of less than 8 square millimeters.

In some embodiments, the echelle gratings occupy an area of less than 8 square millimeters.

In some embodiments, a beam pattern of the second input waveguide has an irradiance, at the first output waveguide, that is at least 15 dB less than the irradiance at the center of the beam pattern.

In some embodiments, a beam pattern of the second input waveguide has an irradiance, at the first output waveguide, that is at least 25 dB less than the irradiance at the center of the beam pattern.

In some embodiments: the second echelle grating further includes a third input waveguide a beam pattern of the second input waveguide has a first null on a first side of the second grating; a beam pattern of the third input waveguide has a first null on the first side of the second grating; and the first output waveguide is between the first null of the beam pattern of the second input waveguide and the first null of the beam pattern of the third input waveguide.

In some embodiments, the first input waveguide has a thickness between 2 microns and 4 microns, and the first output waveguide has a thickness between 2 microns and 4 microns.

In some embodiments, the first input waveguide has a width between 2 microns and 3 microns.

In some embodiments: the first echelle grating includes a plurality of input waveguides including the first input waveguide; each of the plurality of input waveguides of the first echelle grating has an end on the first Rowland circle; and the end of each of the plurality of input waveguides of the first echelle grating has a width equal to a width of the end of the first output waveguide.

In some embodiments, the system further includes: a first plurality of lasers; and a second plurality of lasers, wherein: the first echelle grating includes a plurality of input waveguides including the first input waveguide; the second echelle grating includes a plurality of input waveguides including the second input waveguide; each of the lasers is configured to operate at a different respective wavelength; each of the first plurality of lasers is connected to a respective input waveguide of the input waveguides of the first echelle grating; and each of the second plurality of lasers is connected to a respective input waveguide of the input waveguides of the second echelle grating.

According to an embodiment of the present disclosure, there is provided a spectrophotometer, including: a photonic integrated circuit including the system of claim 19; a photodetector; and a controller connected to: the first plurality of lasers, the second plurality of lasers, and the photodetector, the controller being configured: to cause one laser at a time of the first plurality of lasers and the second plurality of lasers to emit light, and to measure the light received at the photodetector.

BRIEF DESCRIPTION OF THE DRAWINGS

These and other features and advantages of the present disclosure will be appreciated and understood with reference to the specification, claims, and appended drawings wherein:

Each of FIGS. 1-3B, 3D-4B, and 4D-5D is drawn to scale, for a respective embodiment.

DETAILED DESCRIPTION

The detailed description set forth below in connection with the appended drawings is intended as a description of exemplary embodiments of a system including echelle gratings with a shared free propagation region provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
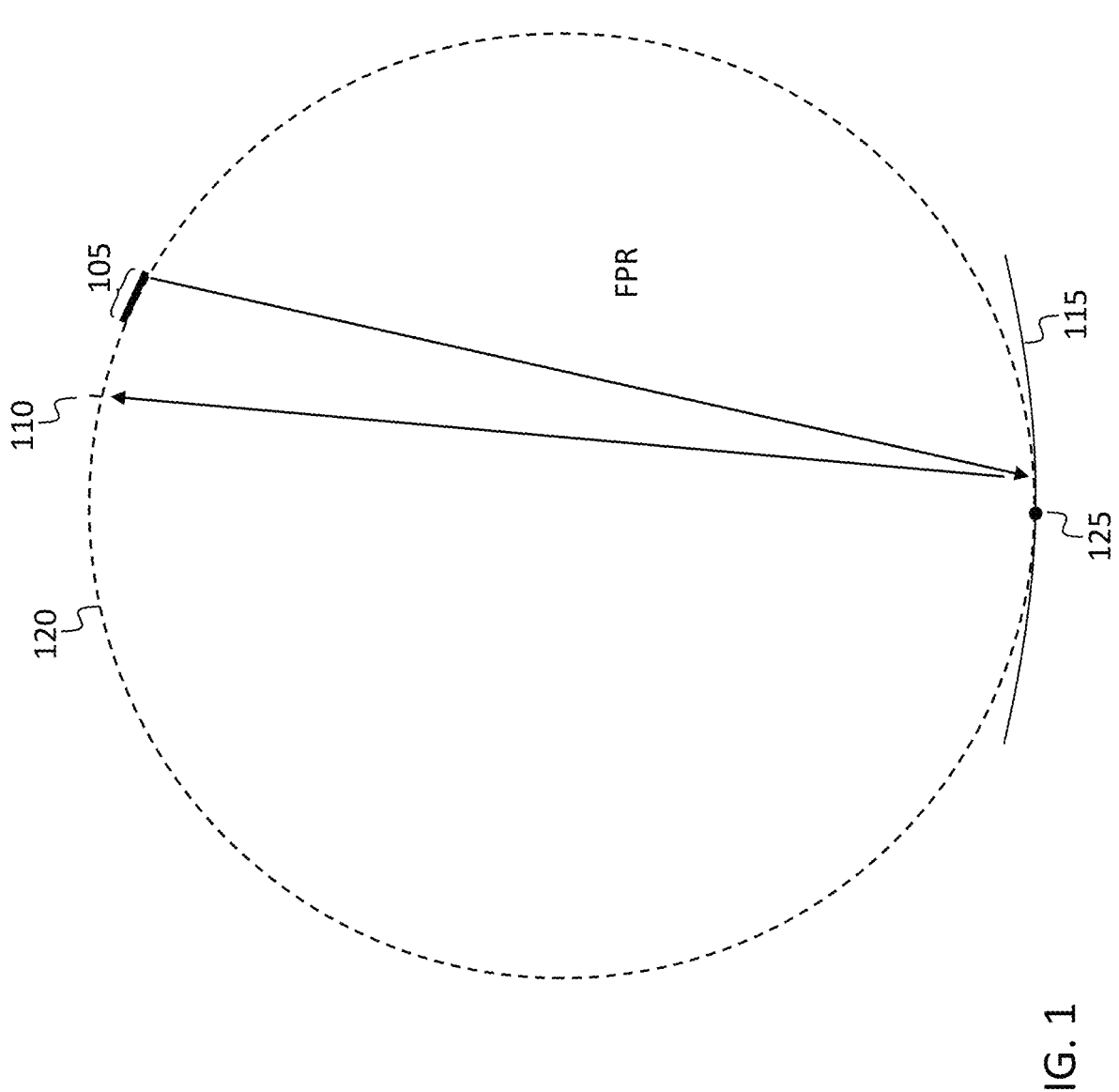
FIG. 1 is a plan view of an echelle grating, according to an embodiment of the present disclosure.

FIG. 1 shows an echelle grating, in some embodiments. As used herein, an "echelle grating" is a component fabricated on a photonic integrated circuit having a plurality of first waveguides 105 (which may, in a multiplexer, be employed as inputs and may be referred to as "input waveguides"), a second waveguide 110 (which may in a multiplexer, be employed as an output and may be referred to as an "output waveguide") and a grating 115. The region between the input waveguides 105, the output waveguide

Figure 6:
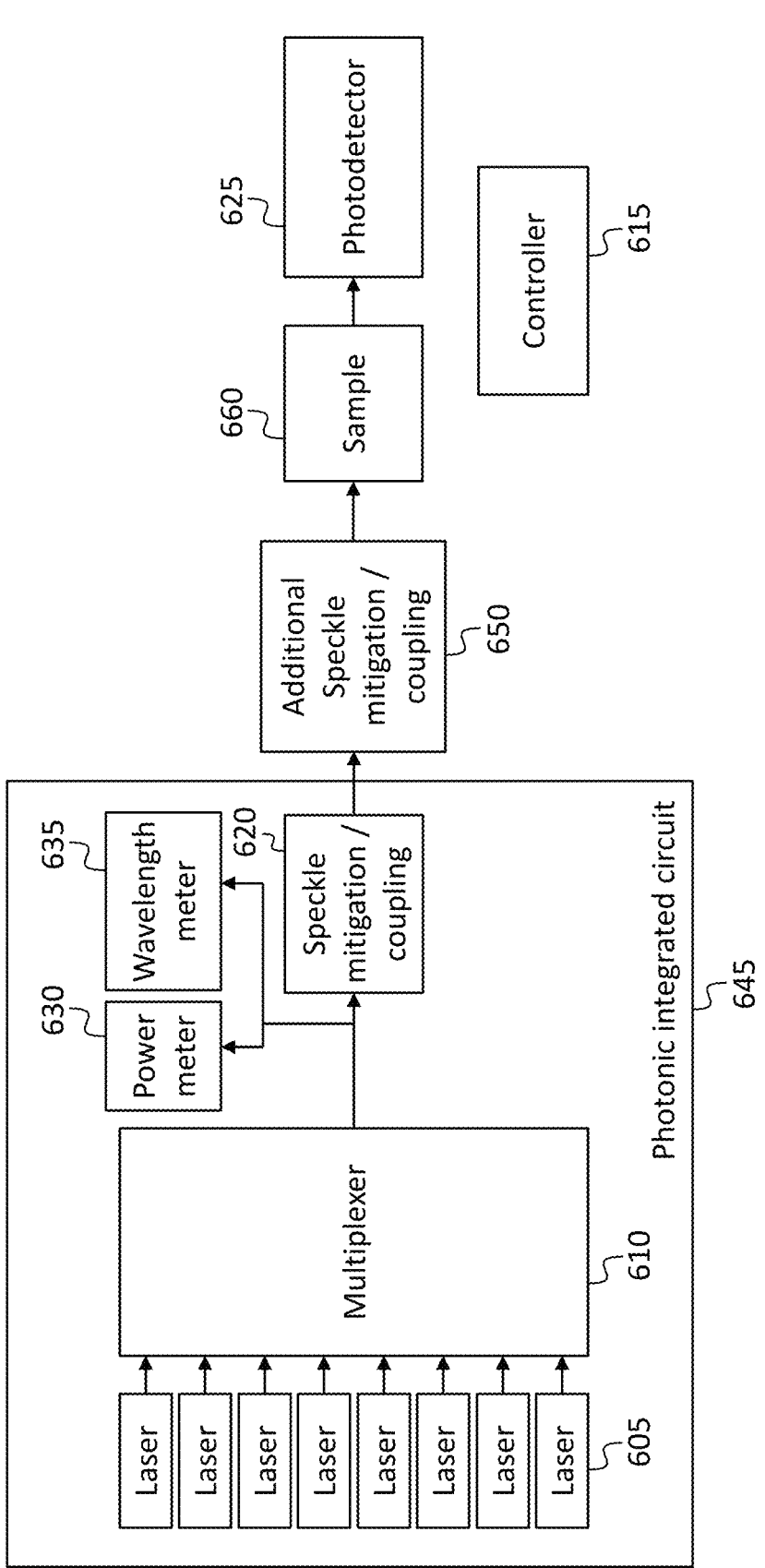
FIG. 6 is a block diagram of a spectrophotometer, according to an embodiment of the present disclosure.

110 and the grating 115, may be referred to as the free propagation region (FPR) of the echelle grating. An echelle grating may be configured, for example, to operate as a wavelength multiplexer (e.g., as illustrated in FIG. 6, discussed in further detail below). A "wavelength multiplexer" as used herein, is an optical device with a plurality of inputs and an output, configured to, receive, at one or more of the inputs, light at a respective wavelength corresponding to the input, and to route the light to the output (with a loss that may be less than the loss in a wavelength-independent multiplexer such as a star coupler, e.g., a loss of less than 6 dB, or less than 3 dB, or less than 2 dB, less than 1 dB). In the case of an echelle grating, the mechanism for the frequency-dependent routing may be reflection from the grating, which may reflect incident light at an angle that depends on the wavelength. The echelle grating may be a reciprocal optical device, and, as such, "input" and "output" are used only to distinguish the set of input waveguides from the output waveguides. As such, the echelle grating may receive light at the output waveguide and transmit the light (according to its wavelength) at one of the input waveguides. Alternatively, the echelle grating of FIG. 1 may equally well be described as an optical device, having an input 110 and a plurality of outputs 105, that is configured to operate as a wavelength demultiplexer.

The echelle grating may be fabricated on a silicon photonic integrated circuit (PIC). For example, the echelle grating may be fabricated by suitable fabrication processes (e.g., photolithographic processes), from a silicon-on-insulator (SOI) wafer including a silicon substrate, a buried oxide (BOX) layer on the substrate, and a device layer. The device layer may be a three-micron thick layer of crystalline silicon. Each of the waveguides (i.e., each of the input and output waveguides) may be strip waveguides, which may be formed by etching away nearly all of the device layer (leaving, e.g., a 250 nm thick layer of silicon on the BOX layer) on both sides of a strip (e.g., a 1.5 micron wide strip or a 2.6 micron wide strip), leaving a waveguide with a substantially rectangular cross section (e.g., a cross section having a height of three microns and a width of 1.5 microns or 2.6 microns). The waveguides used elsewhere in the photonic integrated circuit may have a width of 1.5 microns (such a width may be better suited for fabricating waveguide bends); as the input waveguides and the output waveguide approach the echelle grating they may taper to a greater width, so as to be matched, in the free propagation region of the echelle grating, to beams having a suitable divergence angle.

In the free propagation region the device layer may be unetched (e.g., the free propagation region may be a slab of crystalline silicon 3 microns thick), and in the free propagation region light may be confined vertically but not horizontally, and the beam launched into the free propagation region from any one of the input waveguides 105 may be a diverging beam having a divergence angle corresponding to the width of the end of the input waveguide and to the wavelength of the light. The echelle grating may operate as an imaging system; as such, the width of each of the input waveguides 105 may be selected to be the same as the width of the output waveguide 110.

The ends of the input waveguides 105 and of the output waveguide 110 (e.g., the junctions between these waveguides and the free propagation region) may be on a circle referred to as the Rowland circle 120 of the echelle grating. The grating 115 may also be on the Rowland circle 120, e.g., the grating 115 may be curved, with a larger radius than the radius of the Rowland circle 120, and the grating 115 may coincide with the Rowland circle 120 at one point 125, as shown in FIG. 1.

The grating 115 may be fabricated as a trench, one side wall of which operates as a reflective surface, to reflect light received from the input waveguides 105 back toward the output waveguide 110. The trench may be etched all the way through the device layer (to the BOX layer), and the interior side walls and the bottom of the trench may then be coated with a layer of oxide (e.g., $SiO_2$) followed by a layer of aluminum to increase the reflectivity of the reflective surface. The reflective surface may have a shape that in a plan view is or resembles a sawtooth shape.

Figure 2:
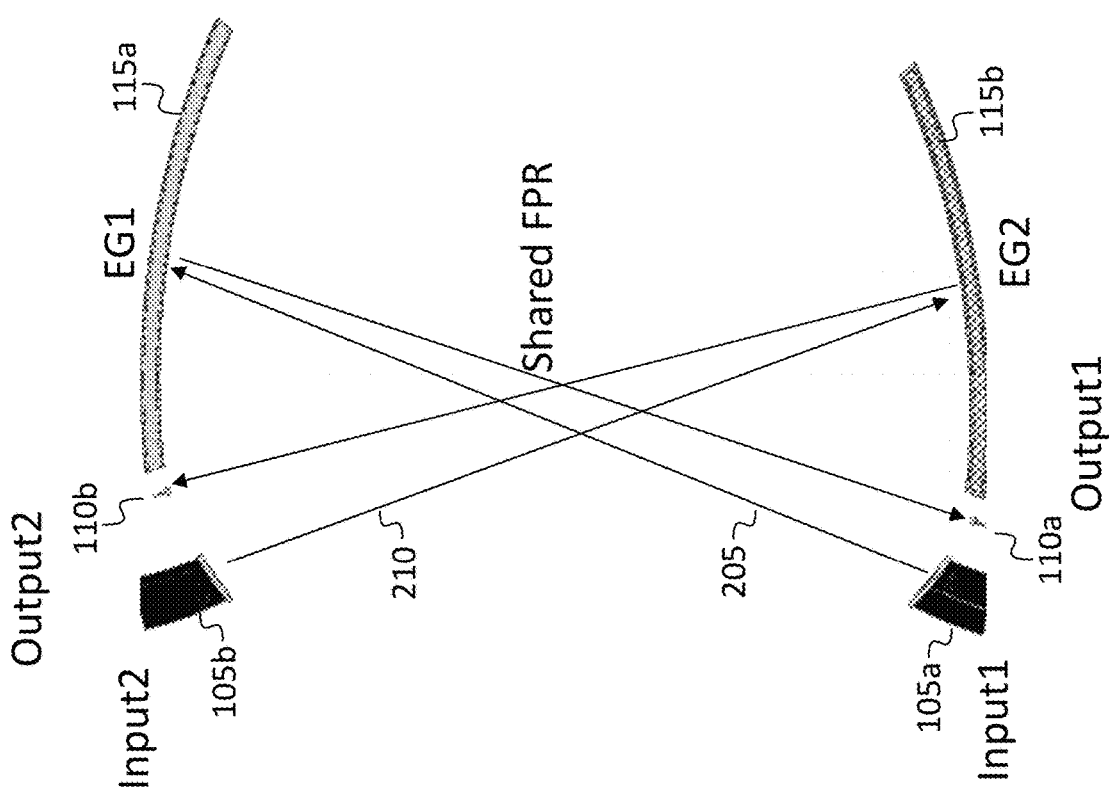
FIG. 2 is a plan view of two echelle gratings with a shared free propagation region, according to an embodiment of the present disclosure.

In some embodiments the free propagation region is shared by several (e.g., two) echelle gratings, as shown in FIG. 2. As illustrated, a first echelle grating includes a first plurality of input waveguides 105a, a first output waveguide 110a and a first grating 115a, and a second echelle grating includes a second plurality of input waveguides 105b, a second output waveguide 110b and a second grating 115b. The first echelle grating and the second echelle grating share a free propagation region as shown, and, for example, an optical path (e.g., a first ray 205) between a first input waveguide of the first plurality of input waveguides 105a and the first grating 115a intersects an optical path (e.g., a second ray 210) between the second input waveguide and the second grating. This sharing of the free propagation region may have the effect that the total chip area occupied, on the photonic integrated circuit, by the two echelle gratings is significantly less than it would be if each echelle grating had a separate, dedicated free propagation region.

In the embodiment of FIG. 2, each of the input waveguides 105 may have a width, at its end, corresponding to a beam divergence that results in the beam being slightly wider, at the grating 115 than the grating 115. In such an embodiment, a small fraction of the light in the beam may spill over at the ends of the grating 115, resulting in a small (but acceptable) optical loss. Although it may be possible to reduce the loss incurred by this mechanism by making each waveguide wider, doing so may either result in a larger spacing between the input waveguides 105 (and a resulting loss in spectral resolution) or a larger device, if the radius of the Rowland circle is increased so as to maintain the spectral resolution.

The two echelle gratings of FIG. 2 may be configured to operate within different wavelength ranges, with, for example, the first echelle grating being configured to operate in a long wavelength (LWL) range extending from a first channel (corresponding to a first input waveguide 105a of the first echelle grating) at a wavelength of 2050 nm to a last channel (corresponding to a last input waveguide 105a of the first echelle grating) at a wavelength of 2390 nm. The second echelle grating may be configured to operate in a middle wavelength (MWL) range extending from a first channel (corresponding to a first input waveguide 105a of the second echelle grating) at a wavelength of 1550 nm to a last channel (e.g., a 45th channel, corresponding to a last input waveguide 105a of the second echelle grating) at a wavelength of 1850 nm.

Figure 3A:
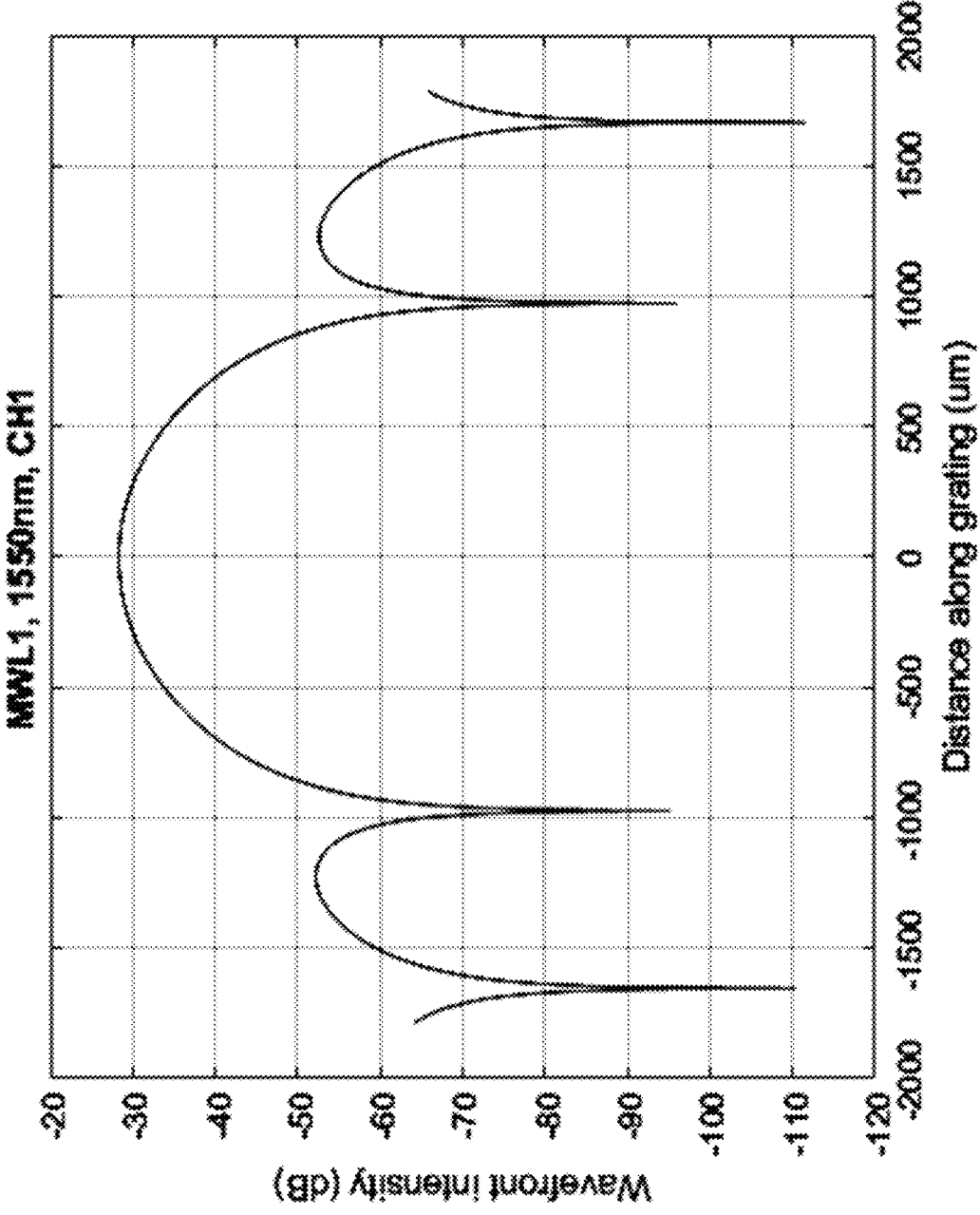
FIG. 3A is a graph of a portion of a beam pattern, according to an embodiment of the present disclosure.
Figure 3B:
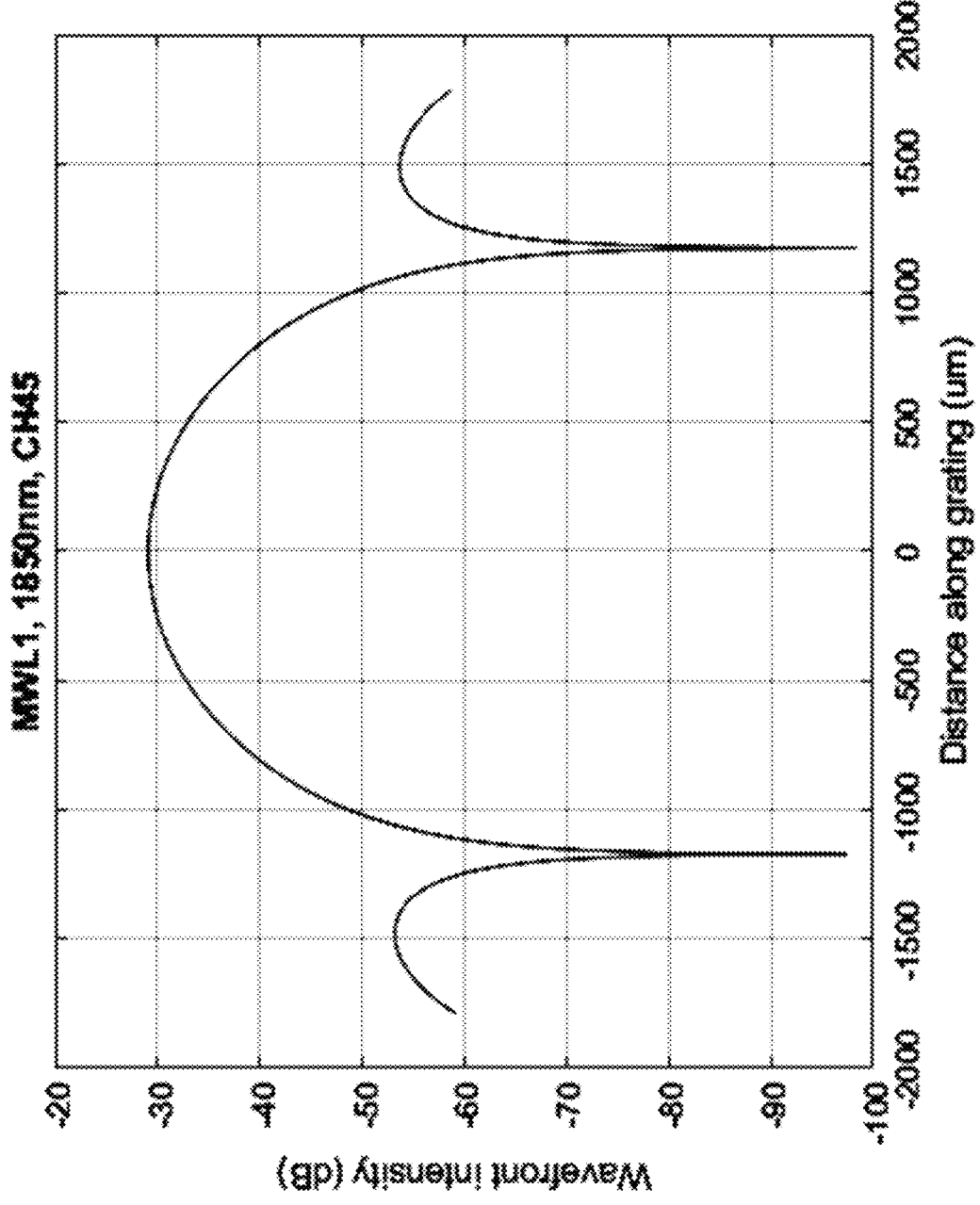
FIG. 3B is a graph of a portion of a beam pattern, according to an embodiment of the present disclosure.

For example, FIG. 3A shows a beam pattern (showing the wavefront intensity, or irradiance, of the beam as a function of position along the grating (and, beyond the ends of the grating, along a circular arc that coincides with the grating)), for a first one of the input waveguides, at 1550 nm (corresponding to the first channel of the MWL range), of the second plurality of input waveguides 105b. The length of the second grating 115b in this embodiment is 1640 microns, so that in the graph of FIG. 3A, it extends from –820 microns to 820 microns. The main lobe of the beam pattern has a (null to null) width of about 1900 microns; as such, its width is slightly greater than the length of the second grating 115b, and each of the first nulls occurs at a distance of about 950 microns from the center of the second grating 115b. FIG. 3B shows a beam pattern for a second one of the input waveguides, at 1850 nm (corresponding to the 45th channel of the MWL range), of the second plurality of input waveguides 105b. The main lobe of the beam pattern of FIG. 3B has a (null to null) width of about 2400 microns, and each of the first nulls occurs at a distance of about 1200 microns from the center of the second grating 115b.

Figure 3C:
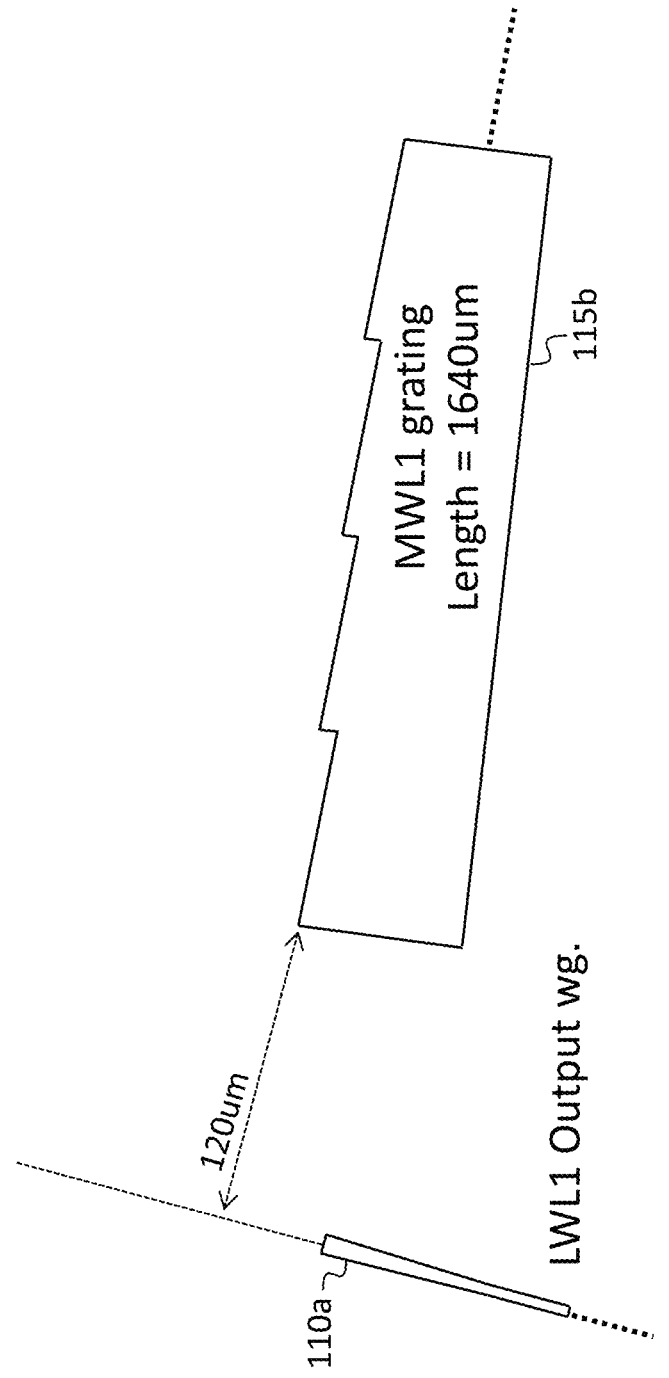
FIG. 3C is an enlarged view of a portion of FIG. 2, according to an embodiment of the present disclosure.
Figure 3D:
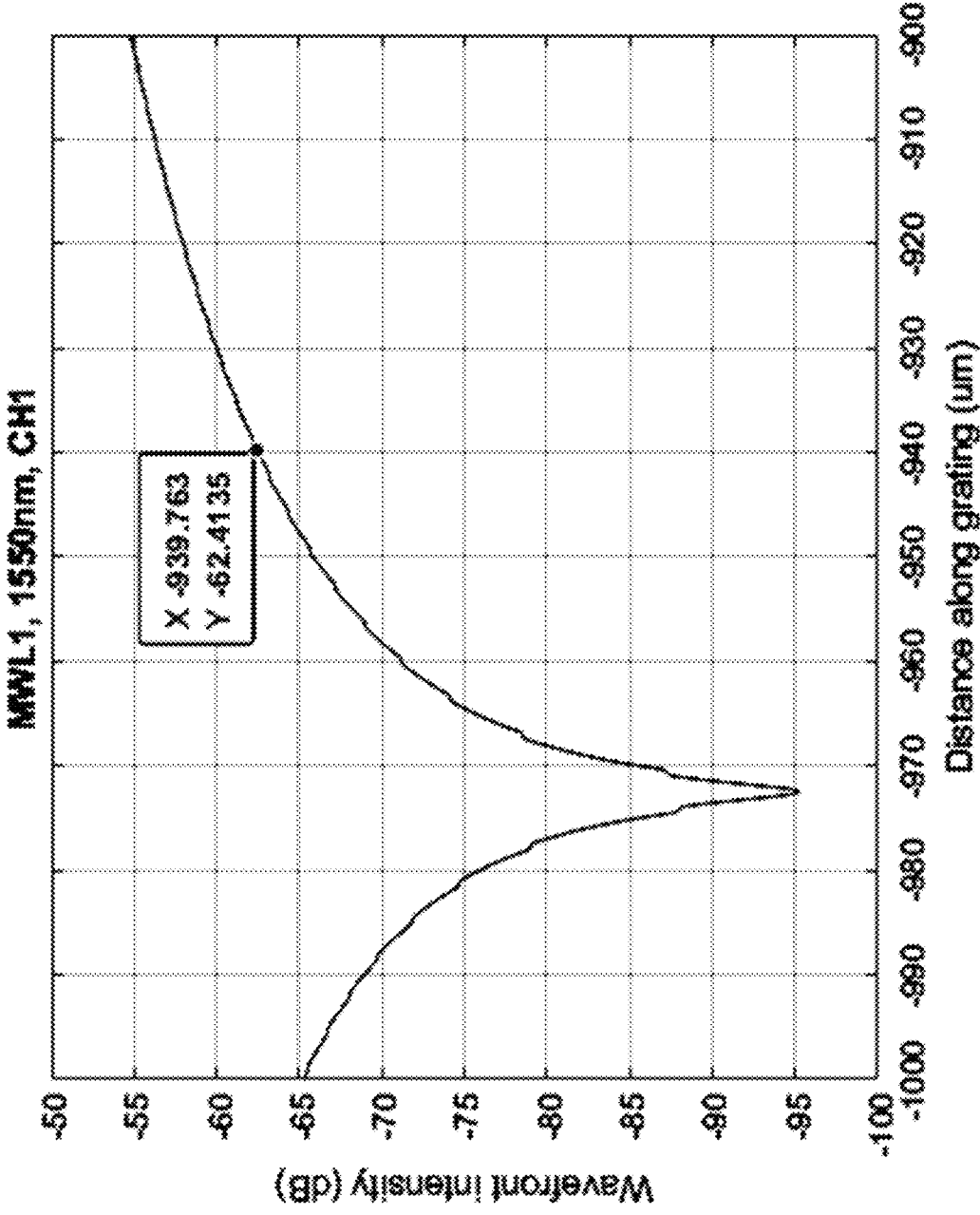
FIG. 3D is a graph of a portion of a beam pattern, according to an embodiment of the present disclosure.
Figure 3E:
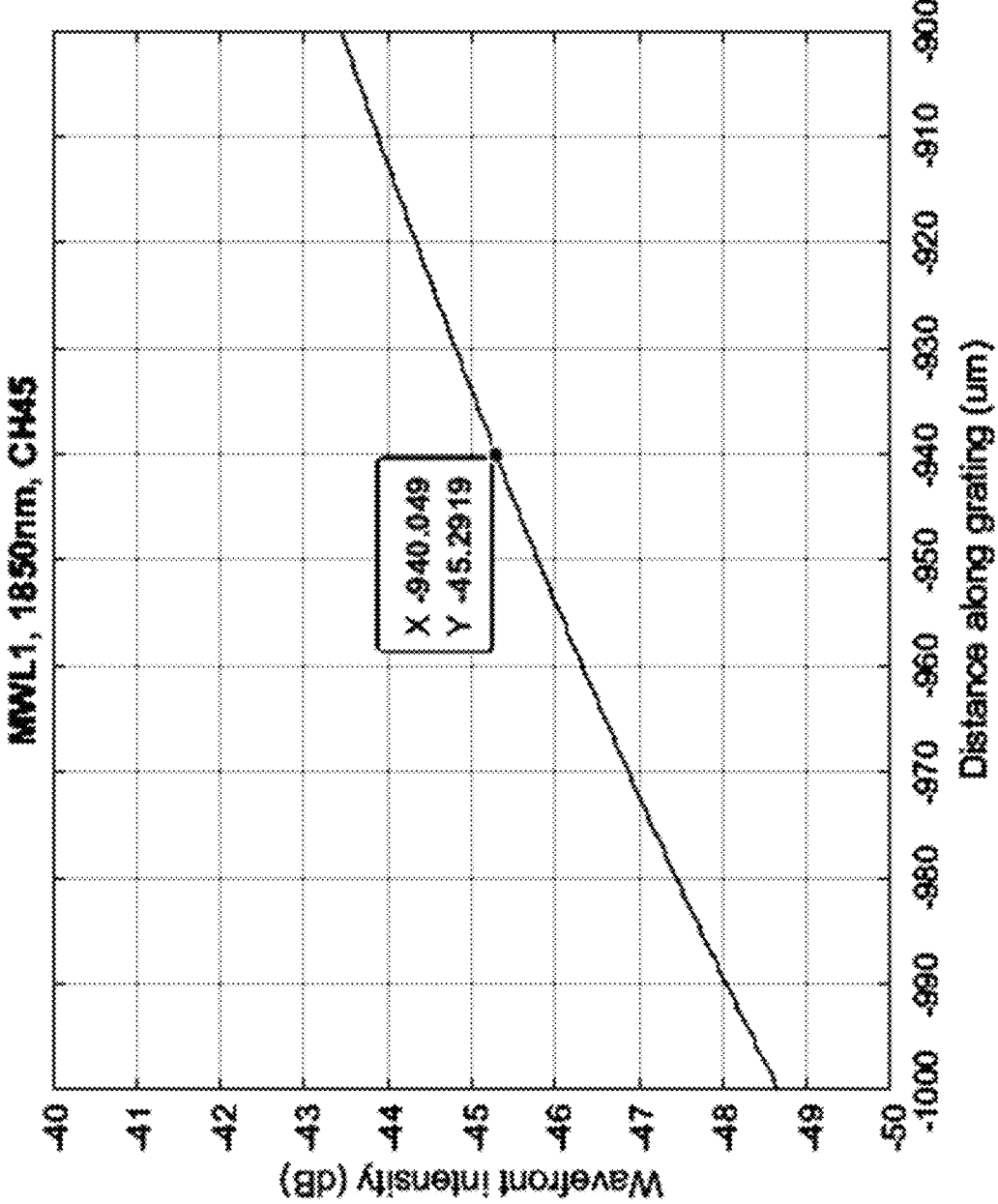
FIG. 3E is a graph of a portion of a beam pattern, according to an embodiment of the present disclosure.

FIG. 3C shows the position of the first output waveguide 110a and the second grating 115b, in some embodiments. The first output waveguide 110a is separated from the end of the second grating 115b by a distance of 120 microns, as shown, i.e., the first output waveguide 110a is separated from the center of the second grating 115b by a distance of 940 microns. Some of the optical power emitted by the end of any one of the second input waveguides 105b may fall on the end of the first output waveguide 110a, and then propagate within the first output waveguide 110a. This coupling of light from an input waveguide 105b of the second echelle grating into the output waveguide 110a of the first echelle grating (or the analogous coupling of light from an input waveguide 105a of the first echelle grating into the output waveguide 110b of the second echelle grating) may be referred to as crosstalk. Crosstalk may degrade the performance of a system including echelle gratings such as those of FIG. 2 if, for example, the light from the two output waveguides 110a, 110b is combined in a subsequent optical element, in which it the contribution due to crosstalk may cause interference (and, e.g., power fluctuations) which may affect the performance of the system. FIGS. 3D and 3E show enlarged views of the beam patterns of FIGS. 3A and 3B, with a cursor in each graph at 940 microns, corresponding to the position of the first output waveguide 110a. For this position of the first output waveguide 110a, the crosstalk increases with increasing wavelength.

In some embodiments, the first output waveguide 110a is instead positioned so that it is between (i) the first null of the first input waveguide (e.g., the input waveguide 105b for channel 1) of the second echelle grating and (ii) the first null of the last input waveguide (e.g., the input waveguide 105b for channel 45) of the second echelle grating, so that the crosstalk is greatest for one of these two input waveguides and lower for all of the other input waveguides, with the minimum crosstalk occurring for one of the input waveguides 105 between the first input waveguide 105 and the last input waveguide 105.

Figure 4A:
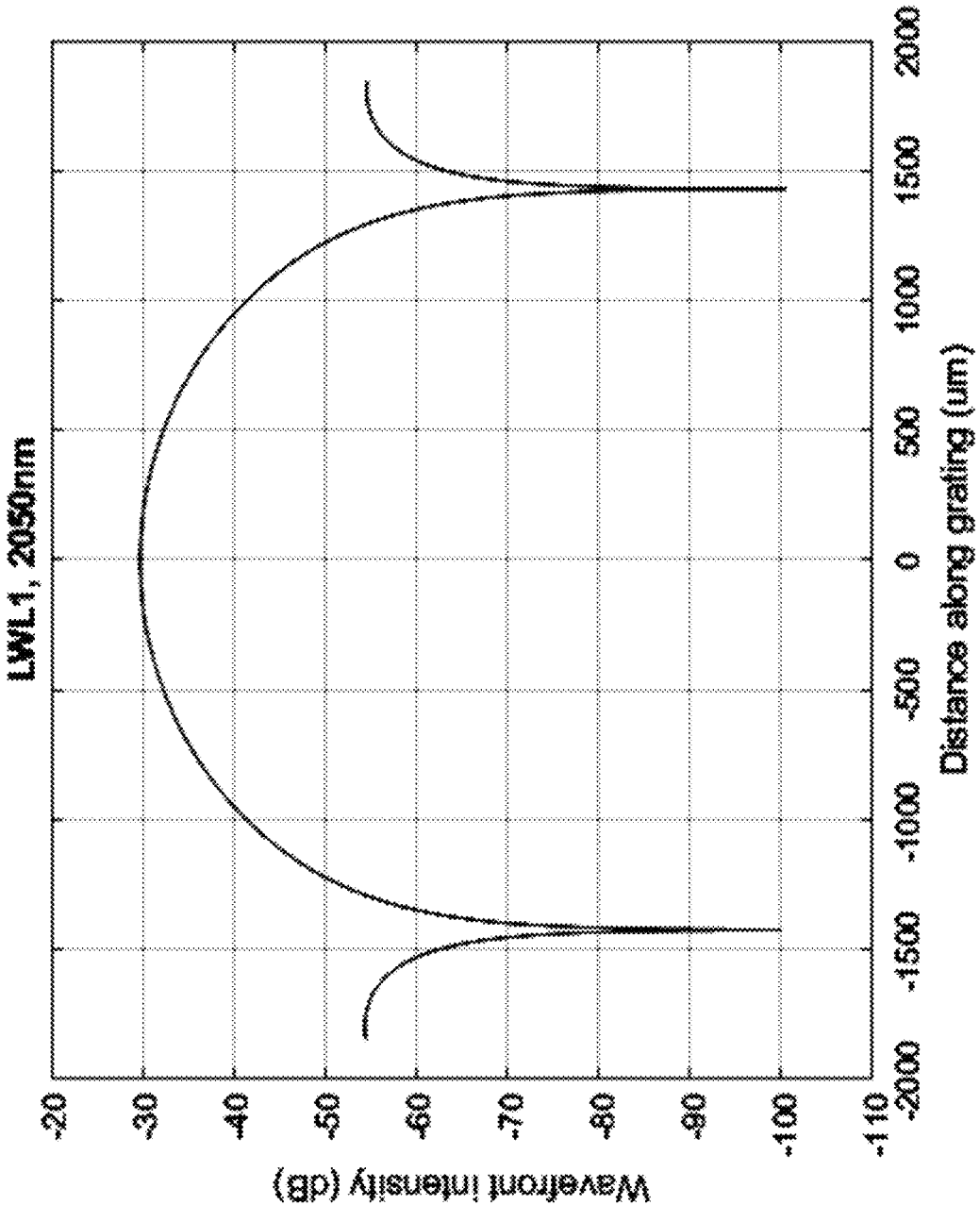
FIG. 4A is a graph of a portion of a beam pattern, according to an embodiment of the present disclosure.
Figure 4B:
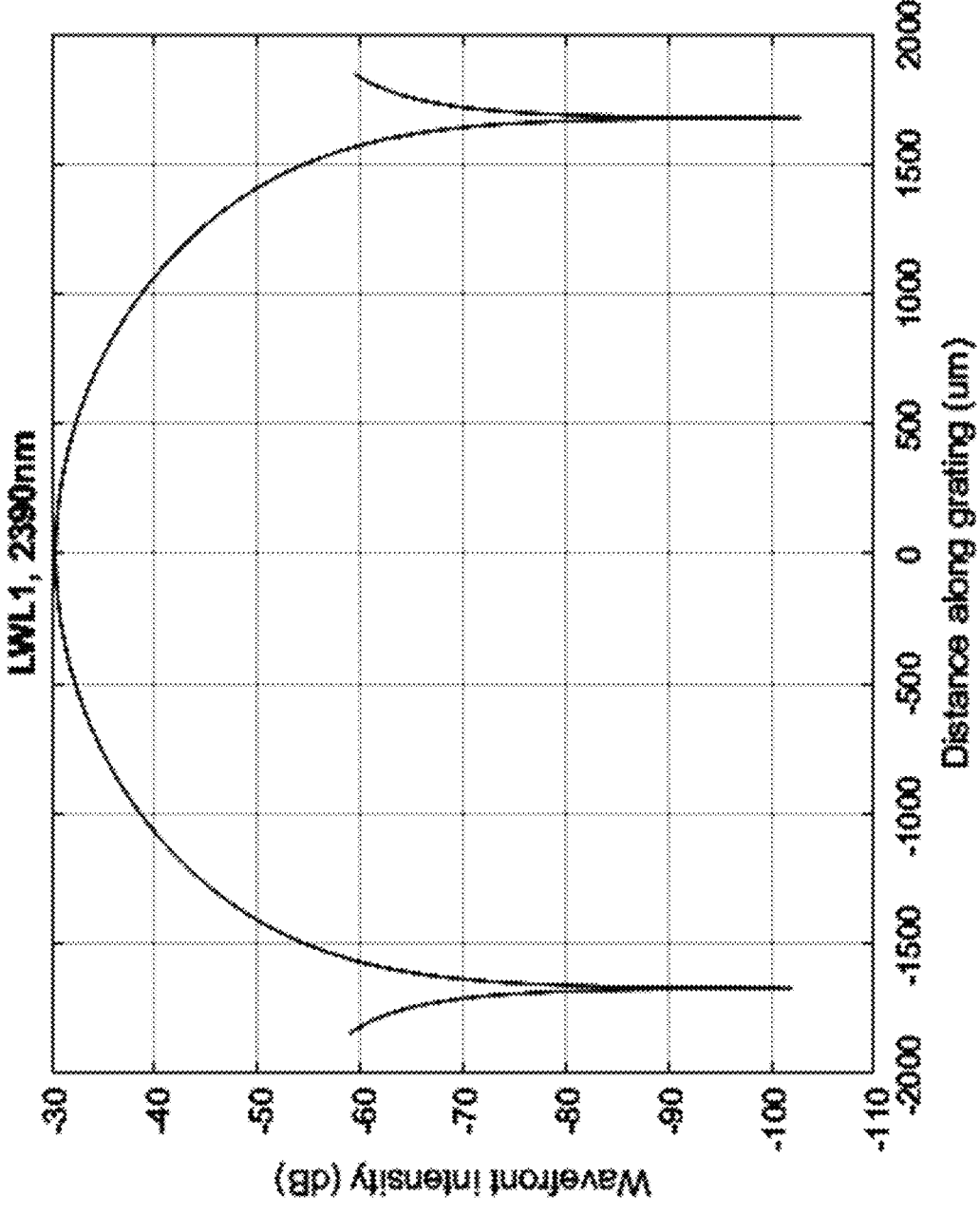
FIG. 4B is a graph of a portion of a beam pattern, according to an embodiment of the present disclosure.

FIG. 4A shows a beam pattern for a first one of the input waveguides of the first plurality of input waveguides 105a, at 2050 nm. The length of the first grating 115a in this embodiment is 1715 microns, so that in the graph of FIG. 4A, it extends from –857.5 microns to 857.5 microns. The main lobe of the beam pattern has a (null to null) width of about 2800 microns; as such, its width is slightly greater than the length of the first grating 115a, and each of the first nulls occurs at a distance of about 1400 microns from the center of the first grating 115a. FIG. 4B shows a beam pattern for a second one of the input waveguides of the first plurality of input waveguides 105a, at 2390 nm. The main lobe of the beam pattern of FIG. 4B has a (null to null) width of about 3400 microns, and each of the first nulls occurs at a distance of about 1700 microns from the center of the first grating 115a.

Figure 4C:
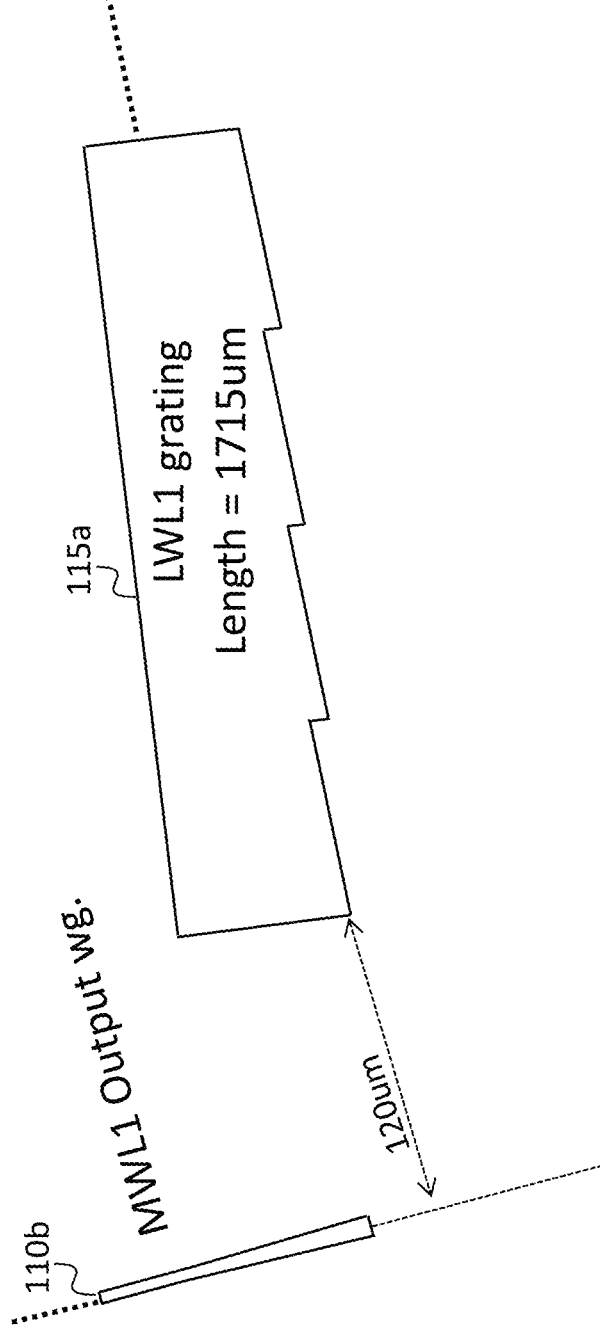
FIG. 4C is an enlarged view of a portion of FIG. 2, according to an embodiment of the present disclosure.
Figure 4D:
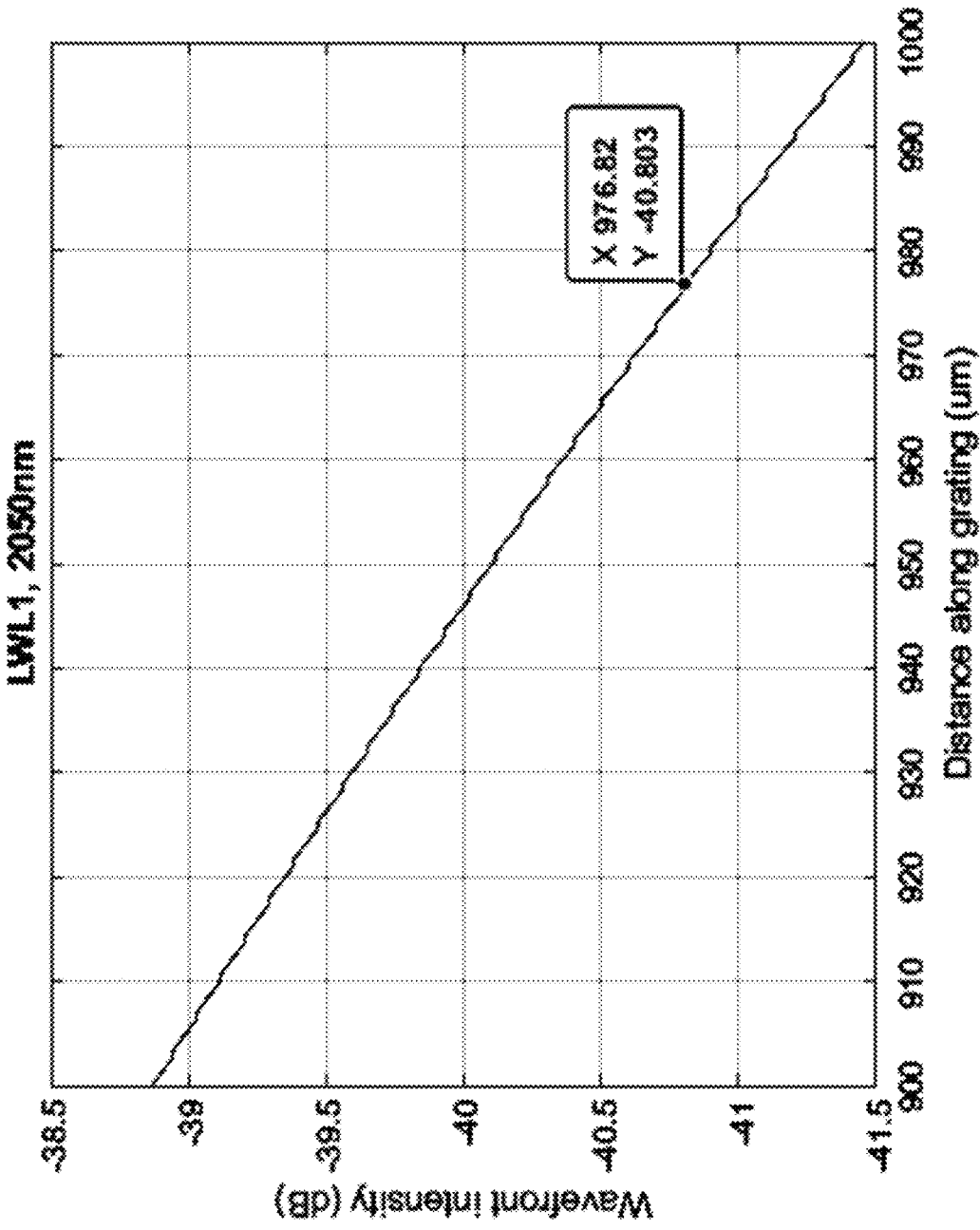
FIG. 4D is a graph of a portion of a beam pattern, according to an embodiment of the present disclosure.
Figure 4E:
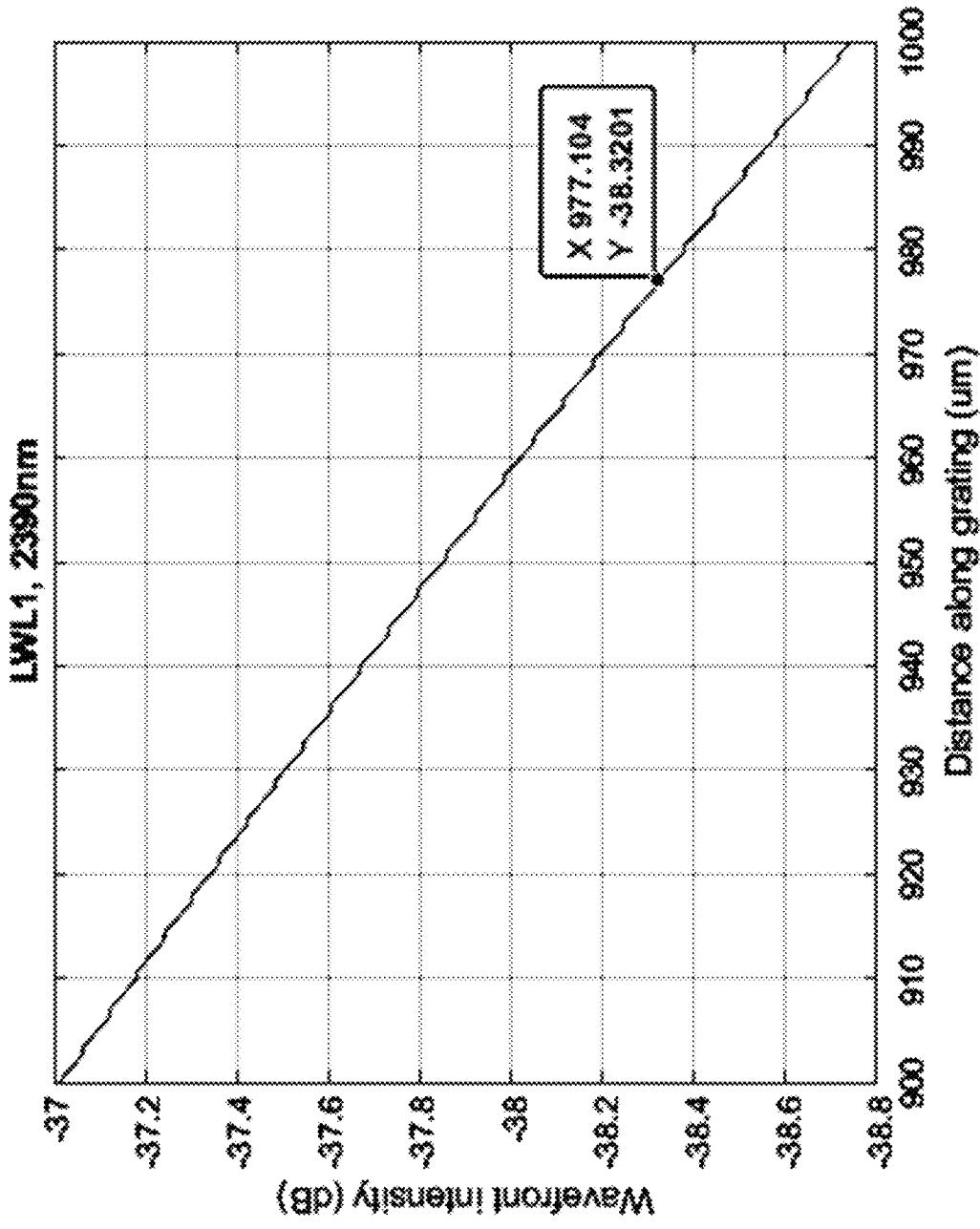
FIG. 4E is a graph of a portion of a beam pattern, according to an embodiment of the present disclosure.

FIG. 4C shows the position of the second output waveguide 110b and the first grating 115a, in some embodiments. The second output waveguide 110b is separated from the end of the first grating 115a by a distance of 120 microns, as shown, i.e., the second output waveguide 110b is separated from the center of the first grating 115a by a distance of 977.5 microns. As in the geometry described above with reference to FIG. 3C, crosstalk may be caused by light emitted by one or more of the first input waveguides 105a coupling into the second output waveguide 110b. FIGS. 4D and 4E show enlarged views of the beam patterns of FIGS. 4A and 4B, with a cursor in each graph near 977 microns, corresponding approximately to the position of the second output waveguide 110b. For this position of the second output waveguide 110b, the crosstalk increases with increasing wavelength.

Figure 5A:
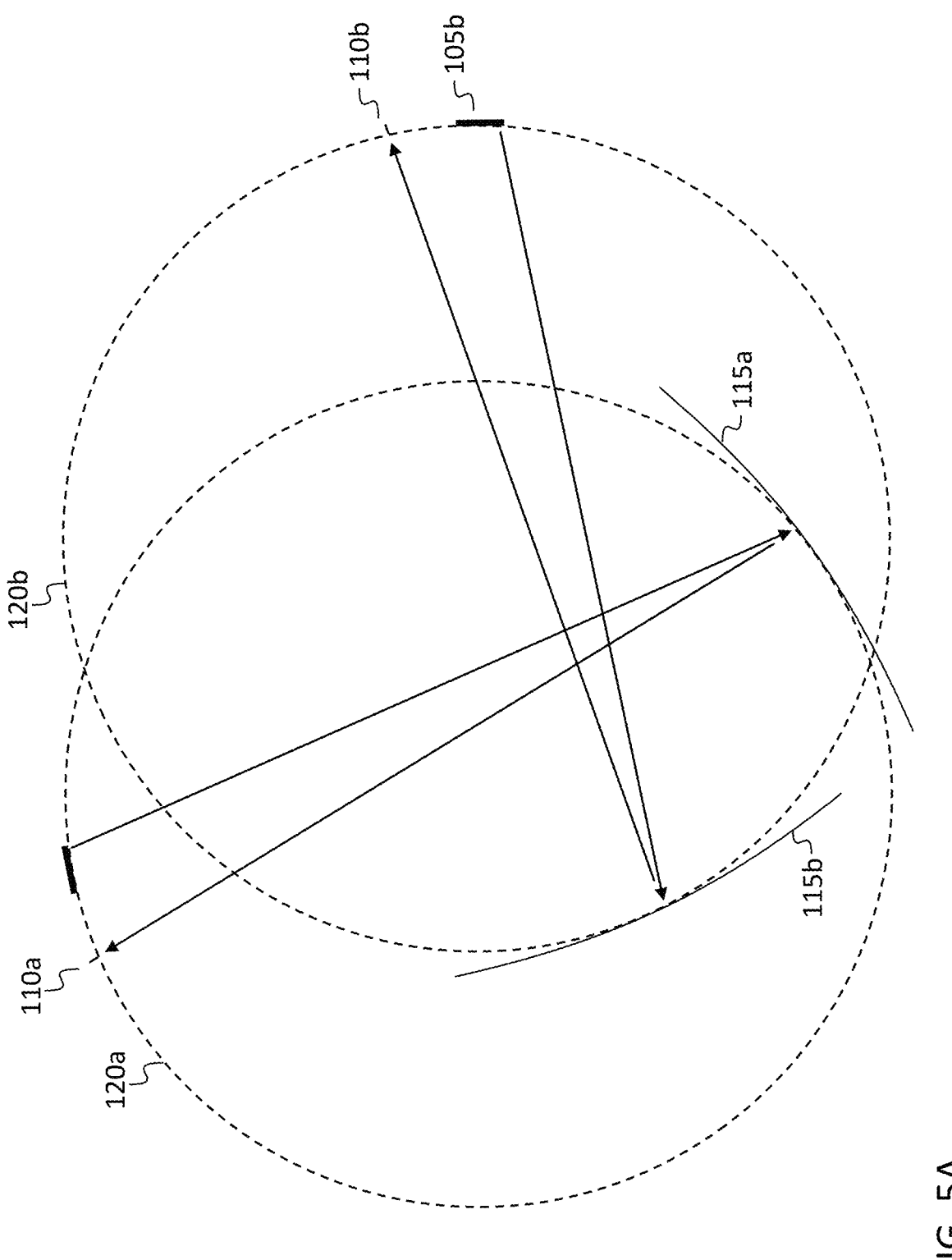
FIG. 5A is a plan view of two echelle gratings with a shared free propagation region, according to an embodiment of the present disclosure.

In the embodiment of FIG. 2, the Rowland circle of the first echelle grating may be approximately the same as the Rowland circle of the second echelle grating (e.g., the two Rowland circles may have substantially the same diameter, and they may overlap entirely or nearly entirely). In other embodiments, the Rowland circles of the two echelle gratings may have different diameters, or, as shown in FIG. 5A, a significant fraction of the area of each of the Rowland circles may not overlap the other Rowland circle.

Figure 5B:
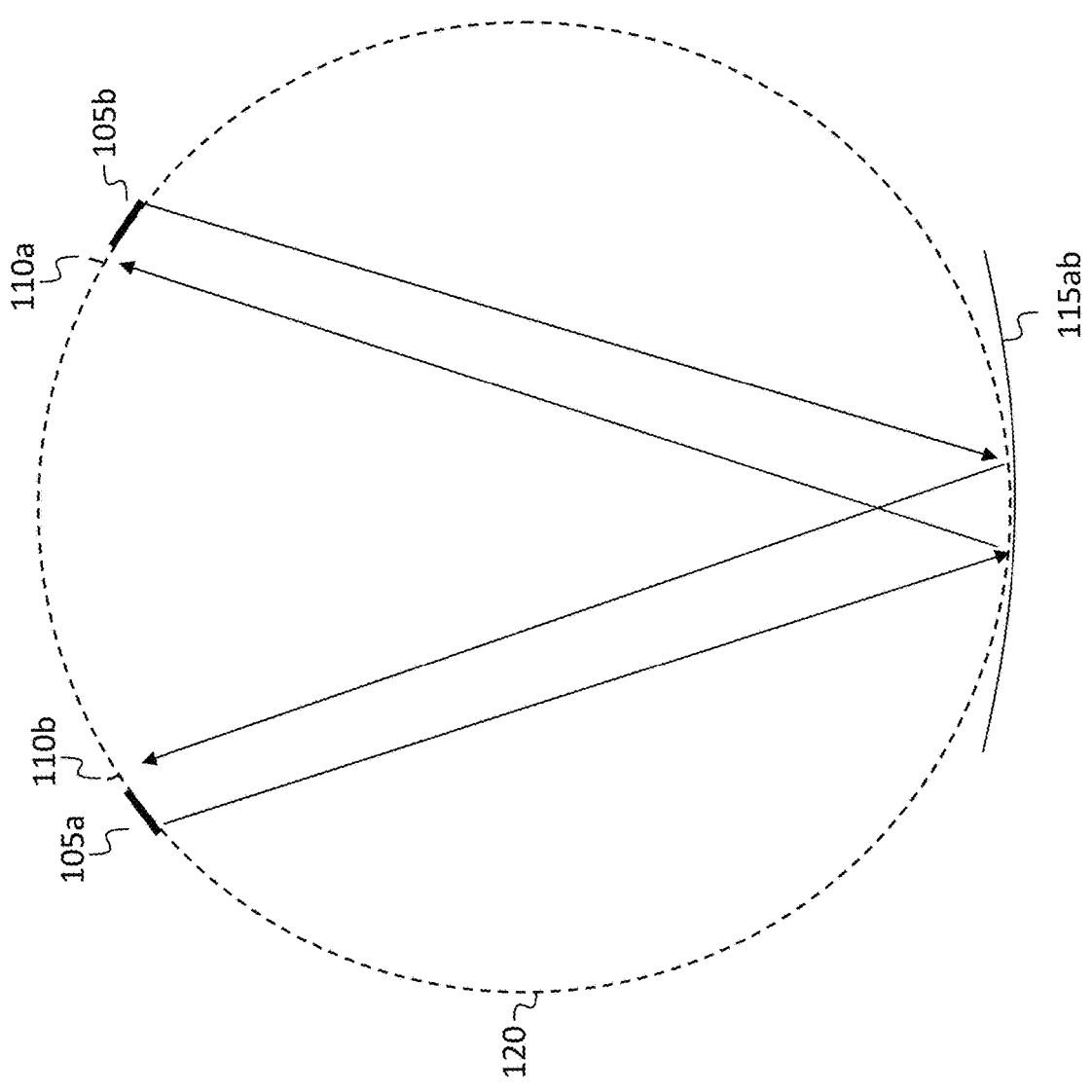
FIG. 5B is a plan view of two echelle gratings with a shared free propagation region, according to an embodiment of the present disclosure.
Figure 5C:
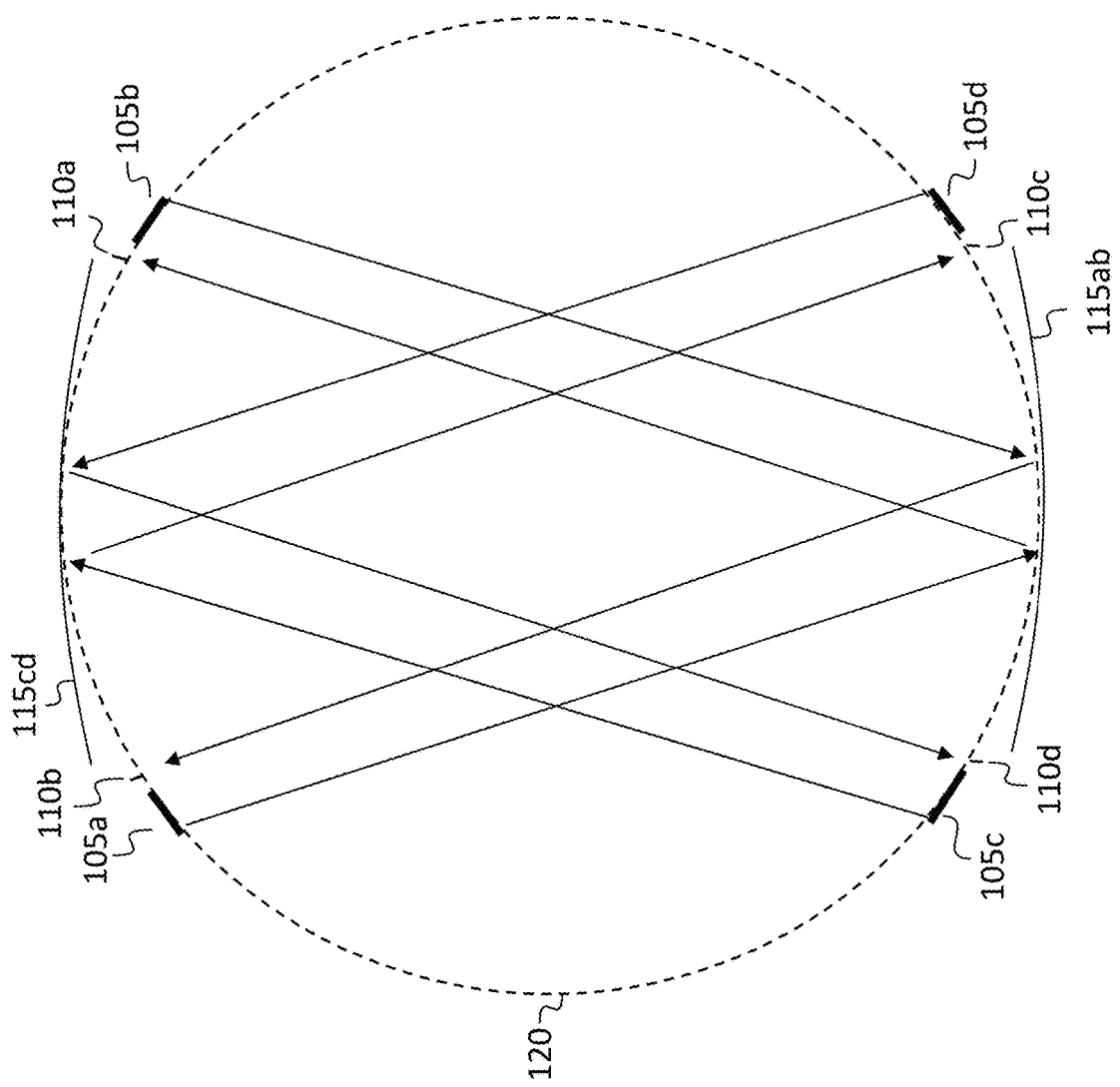
FIG. 5C is a plan view of four echelle gratings with a shared free propagation region, according to an embodiment of the present disclosure.

FIG. 5B shows an embodiment in which two echelle gratings, each of which has a separate output waveguide 110a, 110b, and a separate plurality of input waveguides 105a, 105b share a grating 115ab. In the embodiment of FIG. 5C, a first pair of echelle gratings arranged as in FIG. 5B and a second pair of echelle gratings, also arranged as in FIG. 5B, share a single free propagation region, so that a total of four echelle gratings share one free propagation region. In FIG. 5C, the first pair of echelle gratings includes a first plurality of input waveguides 105a, a second plurality of input waveguides 105b, a first output waveguide 110a, a second output waveguide 110b, and a first shared grating 115ab, and the second pair of echelle gratings includes a third plurality of input waveguides 105c, a fourth plurality of input waveguides 105d, a third output waveguide 110c, a fourth output waveguide 110d, and a second shared grating 115cd. In some embodiments, four additional echelle gratings (configured like the ones in FIG. 5C, and rotated by 90 degrees) may share the same free propagation region (e.g., sharing the same Rowland circle) so that, in such an embodiment, a total of eight echelle gratings may share the free propagation region.

Figure 5D:
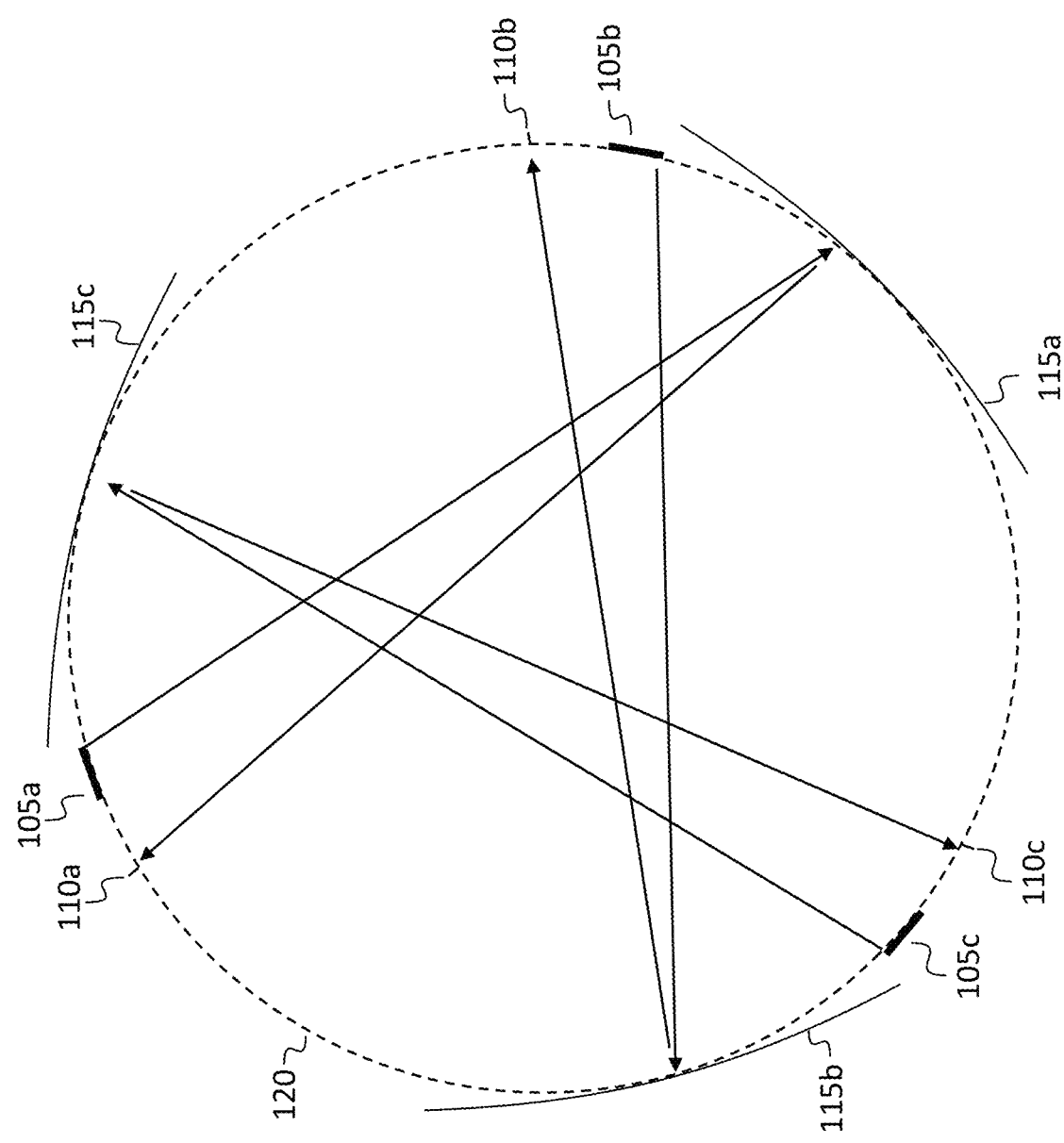
FIG. 5D is a plan view of three echelle gratings with a shared free propagation region, according to an embodiment of the present disclosure.

FIG. 5D shows an embodiment with three echelle gratings, each having a separate grating 115, arranged to share a free propagation region (and, in the embodiment of FIG. 5D, arranged on the same Rowland circle). In some embodiments, more than three (e.g., four) echelle gratings may be arranged around a shared free propagation region in an analogous manner. In the embodiments of FIGS. 2 and 5A-5D, multiple echelle gratings sharing a free propagation region may occupy an area that is significantly smaller than if they were constructed separately, without overlapping free propagation regions. For example, two echelle gratings may fit into an area that is less than 1.7 times (or less than 1.5 times) the area that the smaller of the two echelle gratings would occupy by itself, or less than 0.8 times the area that the two echelle gratings would occupy if constructed without overlapping free propagation regions. In some embodiments, two, three, four, or as many as eight echelle gratings may fit into an area that is between 1.1 times and 2.5 times the area that the smallest of the echelle gratings would occupy by itself. As used herein, the "area" occupied by one or more echelle gratings may be defined as (i) the area of the free propagation region containing any ray that travels from an input waveguide 105, reflects from the corresponding grating 115 and propagates to the corresponding output waveguide 110, or (ii) the total area of the Rowland circles, counting any overlapping portions only once, or (iii) the smallest rectangle containing all of the echelle gratings.

In some embodiments, echelle gratings such as those of FIG. 2 may be used to construct a multiplexer, e.g., for combining light from a plurality of lasers into a single waveguide. Such a multiplexer may be used to construct a spectrophotometer. FIG. 6 is a block diagram of a spectrophotometer, in some embodiments. Each laser 605 of an array of lasers 605 (e.g., ten or more lasers 605, not all of which are shown) is connected to a wavelength multiplexer 610 (which may include two or more echelle gratings, some or all of which may share a free propagation region). Each laser 605 operates at a different respective wavelength and is connected to an input, of the wavelength multiplexer 610, corresponding to the operating wavelength. In operation, one laser is turned on at a time (e.g., by a controller 615, which may be or include a processing circuit), so that the combination of (i) the array of lasers 605 and (ii) the wavelength multiplexer 610 operates as a swept wavelength light source. In the embodiment of FIG. 6, the wavelength separation between lasers 605 that are adjacent in wavelength may be between 5 nm and 50 nm, and the wavelength range may be about 1550 nm to 2500 nm. In some embodiments, one or more gaps may be present in the set of wavelengths (e.g., if a wavelength band within the range is of limited use because of strong absorption by water in the band).

Light from the output of the wavelength multiplexer 610 illuminates the sample 660 (which may be tissue of a patient, or "subject"). In some embodiments, a speckle mitigation system or coupling optics 620 (for reducing the spatial coherence of the probe light, and for producing a beam of the desired shape in the sample 660, respectively), may be present between the output of the wavelength multiplexer 610 and the sample 660. After interacting with the sample in the sample 660, the light may be detected by a photodetector 625. If the photodetector 625 is on the opposite side of the sample 660 from the source of the probe light (as illustrated in FIG. 6), the probe light may be transmitted through the sample 660 to the photodetector 625. In other embodiments the photodetector 625 may be positioned differently, e.g., on the same side of the sample as the source of the probe light, and the probe light may reach the photodetector 625 after scattering one or more times within the sample. This type of optical path may be important for measurements made by illuminating a first location on the skin of a patient with probe light, and detecting light returning from the skin at a second location near the first location.

The photodiode signal may be amplified by a suitable amplifier, and converted to a digital signal by an analog to digital converter, and the resulting digital signal may be fed to the controller 615 for further processing. A power meter 630 and a wavelength meter 635 may measure the optical power and wavelength, respectively, of the probe light, and (i) corrections may be made (e.g., by the controller 615) by adjusting, e.g., the drive currents of the lasers or drive currents of heaters controlling the temperatures of respective gratings of the lasers, or (ii) errors in the transmitted power or wavelength may be compensated for when the data are analyzed. The ratio, as a function of wavelength, of (i) the optical power detected by the photodetector 625 to (ii) the optical power transmitted in the probe light may be used, for example, to infer aspects of the chemical composition of the sample 660.

Various components, of the components illustrated in FIG. 6, may be fabricated on a silicon photonic integrated circuit (PIC) 645. For example, the lasers 605, wavelength multiplexer 610, the power meter 630, the wavelength meter 635, and the speckle mitigation system or coupling optics 620 may be fabricated on a photonic integrated circuit, as shown. The lasers may be fabricated using III-V materials and separately heterogeneously integrated (e.g., by bonding or printing) to the photonic integrated circuit and may be in the form of distributed Bragg reflector (DBR) or distributed-feedback laser (DFB) lasers. An additional speckle mitigation arrangement or coupling optics 650 may be employed to receive the light from the optical output (or outputs) of the photonic integrated circuit 645 and to couple the light into the sample 660. The spectrophotometer may be compact, e.g., having a volume of less than 30 cubic centimeters (e.g., less than 3 cubic centimeters).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least $(1-Y/100)$ times the first number and the second number is at most $(1+Y/100)$ times the first number. As used herein, the word "or" is inclusive, so that, for example, "A or B" means any one of (i) A, (ii) B, and (iii) A and B.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system including echelle gratings with a shared free propagation region have been specifically described and illustrated herein, many modifications and variations will be apparent to those skilled in the art. Accordingly, it is to be understood that a system including echelle gratings with a shared free propagation region constructed according to principles of this disclosure may be embodied other than as specifically described herein. The invention is also defined in the following claims, and equivalents thereof.

What is claimed is:

1. A system, comprising:
a first echelle grating; and
a second echelle grating,
the first echelle grating comprising:
a first input waveguide having an end on a first Rowland circle;
a first grating on the first Rowland circle; and
a first output waveguide having an end on the first Rowland circle,
the second echelle grating comprising:
a second input waveguide having an end on a second Rowland circle;
a second grating on the second Rowland circle; and
a second output waveguide having an end on the second Rowland circle,
the second input waveguide being separate from the first input waveguide,
the second output waveguide being separate from the first output waveguide, and
the first Rowland circle overlapping the second Rowland circle,
wherein:
the second echelle grating further comprises a third input waveguide
a beam pattern of the second input waveguide has a first null on a first side of the second grating;
a beam pattern of the third input waveguide has a first null on the first side of the second grating; and
the first output waveguide is between the first null of the beam pattern of the second input waveguide and the first null of the beam pattern of the third input waveguide.

2. The system of claim 1, wherein an optical path between the first input waveguide and the first grating intersects an optical path between the second input waveguide and the second grating.

3. The system of claim 1, wherein the second grating is the same grating as the first grating.

4. The system of claim 1, wherein the second grating is separate from the first grating.

5. The system of claim 1, wherein at least 30% of the first Rowland circle overlaps the second Rowland circle.

6. The system of claim 1, wherein the first input waveguide has a thickness between 2 microns and 4 microns, and the first output waveguide has a thickness between 2 microns and 4 microns.

7. The system of claim 1, wherein the diameter of the second Rowland circle is within 30% of the diameter of the first Rowland circle.

8. The system of claim 1, further comprising:
a first plurality of lasers; and
a second plurality of lasers,
wherein:
    the first echelle grating comprises a plurality of input waveguides including the first input waveguide;
    the second echelle grating comprises a plurality of input waveguides including the second input waveguide;
    each of the lasers is configured to operate at a different respective wavelength;
    each of the first plurality of lasers is connected to a respective input waveguide of the input waveguides of the first echelle grating; and
    each of the second plurality of lasers is connected to a respective input waveguide of the input waveguides of the second echelle grating.

9. A spectrophotometer, comprising:
a photonic integrated circuit comprising the system of claim 8;
a photodetector; and
a controller connected to:
    the first plurality of lasers,
    the second plurality of lasers, and
    the photodetector,
the controller being configured:
    to cause one laser at a time of the first plurality of lasers and the second plurality of lasers to emit light, and
    to measure the light received at the photodetector.

10. The system of claim 1, wherein the first input waveguide has a width between 2 microns and 3 microns.

11. The system of claim 1, wherein:
the first echelle grating comprises a plurality of input waveguides including the first input waveguide;
each of the plurality of input waveguides of the first echelle grating has an end on the first Rowland circle; and
the end of each of the plurality of input waveguides of the first echelle grating has a width equal to a width of the end of the first output waveguide.

12. The system of claim 1, wherein the echelle gratings occupy an area of less than 8 square millimeters.

13. The system of claim 1, wherein a beam pattern of the second input waveguide has an irradiance, at the first output waveguide, that is at least 15 dB less than the irradiance at the center of the beam pattern.

14. The system of claim 1, wherein a beam pattern of the second input waveguide has an irradiance, at the first output waveguide, that is at least 25 dB less than the irradiance at the center of the beam pattern.

15. A system, comprising:
a first echelle grating; and
a second echelle grating,
the first echelle grating comprising:
    a first input waveguide having an end on a first Rowland circle;
    a first grating on the first Rowland circle; and
    a first output waveguide having an end on the first Rowland circle,
the second echelle grating comprising:
    a second input waveguide having an end on a second Rowland circle;
    a second grating on the second Rowland circle; and
    a second output waveguide having an end on the second Rowland circle,
the second input waveguide being separate from the first input waveguide,
the second output waveguide being separate from the first output waveguide, and
the first Rowland circle overlapping the second Rowland circle,
wherein less than 80% of the first Rowland circle overlaps the second Rowland circle.

16. A system, comprising:
a first echelle grating; and
a second echelle grating,
the first echelle grating comprising:
    a first input waveguide having an end on a first Rowland circle;
    a first grating on the first Rowland circle; and
    a first output waveguide having an end on the first Rowland circle,
the second echelle grating comprising:
    a second input waveguide having an end on a second Rowland circle;
    a second grating on the second Rowland circle; and
    a second output waveguide having an end on the second Rowland circle,
the second input waveguide being separate from the first input waveguide,
the second output waveguide being separate from the first output waveguide, and
the first Rowland circle overlapping the second Rowland circle,
wherein the system further comprises a third echelle grating,
the third echelle grating comprising:
    a third input waveguide having an end on a third Rowland circle;
    a third grating on the third Rowland circle; and
    a third output waveguide having an end on the third Rowland circle,
the first Rowland circle overlapping the third Rowland circle.

17. The system of claim 16, further comprising a fourth echelle grating,
the fourth echelle grating comprising:
    a fourth input waveguide having an end on a fourth Rowland circle;
    a fourth grating on the fourth Rowland circle; and
    a fourth output waveguide having an end on the fourth Rowland circle,
the first Rowland circle overlapping the fourth Rowland circle.

18. The system of claim 17, wherein the echelle gratings occupy an area of less than 8 square millimeters.

19. The system of claim 16, wherein the echelle gratings occupy an area of less than 8 square millimeters.

\* \* \* \* \*